US010609786B2

(12) United States Patent
Chiang et al.

(10) Patent No.: US 10,609,786 B2
(45) Date of Patent: Mar. 31, 2020

(54) ILLUMINATION SYSTEM AND CONTROL METHOD THEREOF

(71) Applicant: Industrial Technology Research Institute, Hsinchu (TW)

(72) Inventors: Ya-Hui Chiang, Hsinchu County (TW); Chia-Fen Hsieh, Hsinchu County (TW); Yuan-Ching Chen, Hsinchu County (TW); Chun-Hsing Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/936,472

(22) Filed: Mar. 27, 2018

(65) Prior Publication Data

US 2019/0069376 A1 Feb. 28, 2019

Related U.S. Application Data

(60) Provisional application No. 62/549,448, filed on Aug. 24, 2017.

(30) Foreign Application Priority Data

Dec. 13, 2017 (TW) ............................ 106143693 A

(51) Int. Cl.
*H04B 10/00* (2013.01)
*H05B 37/00* (2006.01)
(Continued)

(52) U.S. Cl.
CPC ..... *H05B 37/0227* (2013.01); *H05B 33/0842* (2013.01); *H05B 33/0869* (2013.01); *H05B 33/0872* (2013.01)

(58) Field of Classification Search
CPC ......... G10K 11/30; A61B 8/12; A61B 8/4281; A61B 1/0052; A61B 8/06; A61B 5/015;
(Continued)

(56) References Cited

U.S. PATENT DOCUMENTS

| | | | |
|---|---|---|---|
| 8,664,864 | B2 | 3/2014 | Salsbury |
| 9,608,725 | B2 | 3/2017 | Aoyama et al. |

(Continued)

FOREIGN PATENT DOCUMENTS

| | | |
|---|---|---|
| CN | 101282858 | 8/2012 |
| CN | 103098546 | 5/2013 |

(Continued)

OTHER PUBLICATIONS

Areni et al., "The influence of in-store lighting on consumers' examination of merchandise in a wine store," International Journal of Research in Marketing, Mar. 1994, pp. 117-125.

(Continued)

*Primary Examiner* — Minh D A
(74) *Attorney, Agent, or Firm* — JCIPRNET

(57) ABSTRACT

An illumination system including light source devices, a light receiver, a calculation module and a control module is provided. The light source devices emit light beams having different frequencies respectively. The light receiver receives at least one of the light beams emitted from the light source devices. The calculation module is coupled to the light receiver and obtains at least one optical parameter of the at least one of the light beams according to the at least one of the light beams received by the light receiver. Each of the at least one optical parameter includes a light intensity, a color temperature, a color rendering index or an illumination ratio. The control module is coupled to the calculation module and the light source devices. The control module controls the at least one optical parameter of the at (Continued)

least one of the light beams. A control method thereof is also provided.

18 Claims, 4 Drawing Sheets

(51) Int. Cl.
*H05B 37/02* (2006.01)
*H05B 33/08* (2020.01)

(58) Field of Classification Search
CPC . A61B 5/02416; A61B 5/0261; A61B 3/1233; A61B 5/024; A61B 5/02427; A61B 5/02154; A61B 5/02255; A61B 5/021; A61B 5/022; A61B 5/0215; A61B 5/02125; A61B 5/02225; G01J 5/04; G01J 5/02; G01J 5/08; G01J 2005/068; G01L 11/02; G01L 9/0077
See application file for complete search history.

(56) References Cited

U.S. PATENT DOCUMENTS

| | | | | |
|---|---|---|---|---|
| 2002/0154498 | A1* | 10/2002 | Cramer | F21V 33/0064 362/112 |
| 2015/0077012 | A1 | 3/2015 | Lin | |
| 2015/0296589 | A1* | 10/2015 | Melanson | H05B 33/0821 315/151 |
| 2016/0323972 | A1* | 11/2016 | Bora | H05B 33/0842 |
| 2017/0231053 | A1* | 8/2017 | Underwood | G06T 7/20 |
| 2017/0347006 | A1* | 11/2017 | Ryan | H04N 5/3532 |

FOREIGN PATENT DOCUMENTS

| | | |
|---|---|---|
| CN | 104540269 | 4/2015 |
| CN | 103763839 | 8/2016 |
| CN | 106102261 | 11/2016 |
| CN | 103607832 | 1/2017 |
| TW | 201123978 | 7/2011 |
| TW | 201138552 | 11/2011 |
| TW | 201143520 | 12/2011 |
| TW | 201233243 | 8/2012 |
| TW | M439135 | 10/2012 |
| TW | 201327497 | 7/2013 |
| TW | I573494 | 3/2017 |
| TW | 201715918 | 5/2017 |
| TW | 201729645 | 8/2017 |

OTHER PUBLICATIONS

Bayarri et al., "Influence of Color on Perception of Sweetness and Fruit Flavor of Fruit Drinks," Food Science and Technology International, Oct. 2001, pp. 399-404.
Flynn, Abstract of "A study of subjective responses to low energy and nonuniform lighting systems," Lighting Design and Application, Feb. 1977, pp. 1-2.
Cho et al., "Color and illuminance level of lighting can modulate willingness to eat bell peppers," Journal of the Science of Food and Agriculture, Aug. 2014, pp. 2049-2056.
Kasof, "Indoor lighting preferences and bulimic behavior: An individual differences approach," Personality and Individual Differences, Feb. 2002, pp. 383-400.
Office Action of Taiwan Counterpart Application, dated Aug 3, 2018, pp. 1-8.
"Office Action of Taiwan Counterpart Application," dated Feb. 13, 2019, p. 1-p. 9.

* cited by examiner

ILLUMINATION SYSTEM AND CONTROL METHOD THEREOF

CROSS-REFERENCE TO RELATED APPLICATION

This application claims the priority benefits of U.S. provisional application Ser. No. 62/549,448, filed on Aug. 24, 2017 and Taiwan application serial no. 106143693, filed on Dec. 13, 2017. The entirety of each of the above-mentioned patent applications is hereby incorporated by reference herein and made a part of this specification.

TECHNICAL FIELD

The disclosure relates to an illumination system measuring light information and light information feedback and a control method thereof.

BACKGROUND

Along with the introduction of the concept of smart life, smart lighting also receives more and more attention. The smart lighting connects the light source devices, the information management platform, and light receiver mainly through wired or wireless signal transmission, so the optical parameter, such as brightness, light color, on-off state, etc., is automatically adjusted according to environmental requirements, or metal or physiological requirements of human body, so as to create appropriate and comfortable lighting environment, to make the illumination system become smarter and more suitable to humanity and usage requirements.

However, the existing smart lighting still has many problems. For example, after the initial optical parameter setting, the code number of each of the light source devices must be remembered. If the code number of each of the light source devices is not remembered in the next use, it will take time to pair the light source devices with the code numbers, which causes inconvenience in use. Moreover, when there are many light source devices in the same space, the existing smart lighting system cannot measure the optical parameter of each light source at the same time, so it is impossible to efficiently create a desired lighting environment.

SUMMARY

The disclosure provides an illumination system and a control method thereof, capable of solving the problems of inconvenience and lack of efficiency in use.

An illumination system of the disclosure includes a plurality of light source devices, a light receiver, a calculation module and a control module. The light source devices emit light beams having different frequencies respectively. The light receiver receives at least one of the light beams emitted from the light source devices. The calculation module is coupled to the light receiver and obtains at least one optical parameter of the at least one of the light beams according to the at least one of the light beams received by the light receiver. Each of the at least one optical parameter includes a light intensity, a color temperature, a color rendering index or an illumination ratio. The control module is coupled to the calculation module and the light source devices. The control module controls the at least one optical parameter of the at least one of the light beams.

The disclosure provides a control method of an illumination system including the following steps: receiving at least one of a plurality of light beams having different frequencies, calculating at least one optical parameter of the at least one of the light beams, wherein each of the at least one optical parameter includes a light intensity, a color temperature, a color rendering index, or an illumination ratio, and controlling the at least one optical parameter of the at least one of the light beams.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
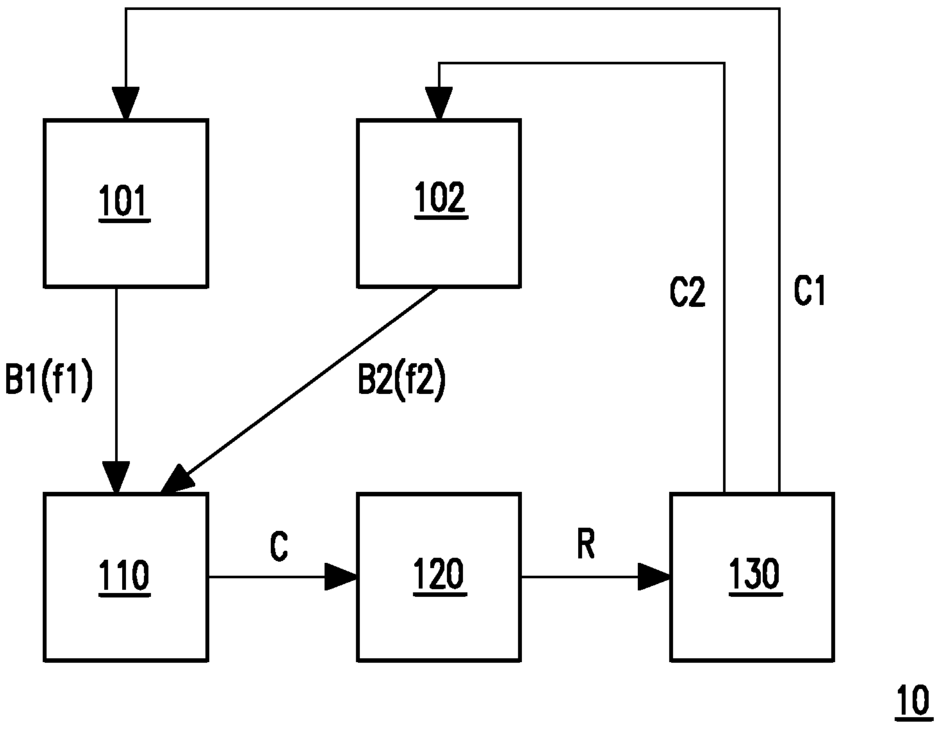
FIG. 1 is a schematic view of an illumination system according to an embodiment of the disclosure.

FIG. 1 is a schematic view of an illumination system according to an embodiment of the disclosure. Referring to FIG. 1, an illumination system 10 of the disclosure includes a plurality of light source devices (such as a first light source device 101 and a second light source device 102, but the number of light source devices in the illumination system 10 is not limited thereto), a light receiver 110, a calculation module 120, and a control module 130.

Each light source device is adapted to emit a light beam. For example, each light source device includes one or more light-emitting elements (not shown), and each of the light-emitting elements may be a light emitting diode, but the disclosure is not limited thereto.

The light source devices are adapted to emit light beams having different frequencies, respectively. As shown in FIG. 1, a frequency f1 of a first light beam B1 emitted by the first light source device 101 is different from a frequency f2 of a second light beam B2 emitted by the second light source device 102. Herein, the teen "frequency" may indicate the flicker frequency of the light beam, and each of the flicker frequencies is corresponding to an identification code. For general applications such as indoor lighting, the frequency of each light beam is preferably greater than 100 Hertz (Hz) so that the flicker of the light beam is imperceptible to human eye. For commercial lighting applications, the frequency of each light beam is preferably greater than 3000 Hertz, thus creating a suitable and comfortable lighting environment.

Each light beam has an optical parameter which can be adjusted according to demand. For example, the adjustable optical parameter includes light intensity, color temperature, color rendering index (CRI), or illumination ratio. The illumination ratio of one light beam may be defined as a ratio of light intensity of this light beam to total light intensity of all of the light beams or a ratio of luminance of this light beam to total luminance of all of the light beams.

Depending on the purpose of application or the applying environment, the light beams emitted by the light source devices may have equal or different values of the optical parameter(s). For example, when the illumination system 10 is applied to lighting environments that require more consistent lighting appearance, such as in home, classroom, or office, etc., the light beams emitted by the light source devices may have equal values of the optical parameter(s). On the other hand, when the illumination system 10 is applied to lighting environments that require lighting appearance to highlight the illuminated targets or to differentiate the regions, such as museum, shopping mall or auditorium, etc., the light beams emitted by the light source devices may have different values of the optical parameter(s).

Take commercial lighting as an example, generally, the light source device serving as the main lighting and the light source device serving as the environmental lighting illuminate the items, which need to be highlighted or emphasized, at the same time (Such as items in exhibition or auction, etc.). The light beam emitted by the light source device serving as main lighting (such as the first light beam B1 emitted by the first light source device 101) and the light beam emitted by the light source device serving as environmental lighting (such as the second light beam B2 emitted by the second light source device 102) have different values of the optical parameter (such as light intensity). According to actual test results, it is discovered that regions or items with higher illumination may not necessarily receive more attention, and when light intensity of the first light beam B1 is greater than or equal to light intensity of the second light beam B2, preferably 2-20 times greater, the target illuminated by the first light beam B1 and the second light beam B2 can receive more attention.

The light receiver 110 is configured to receive at least one of the light beams emitted from the light source devices. For example, the light receiver 110 may include a light sensing element. The light sensing element may include a photo diode (PD), a charge coupled device (CCD), a complementary metal oxide semiconductor (CMOS), a spectrometer or other types of light sensing elements.

Figure 2:
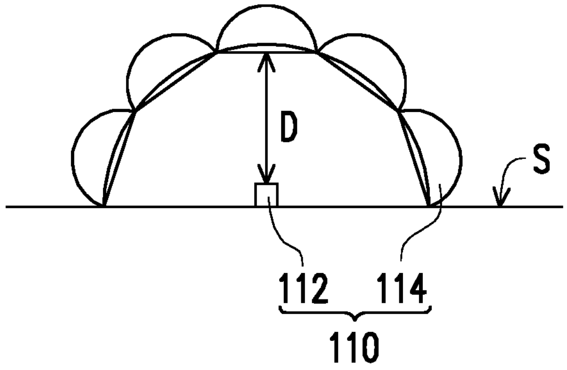
FIG. 2 and FIG. 3 respectively are cross-sectional schematic views of two types of light receiver according to an embodiment of the disclosure.
Figure 3:
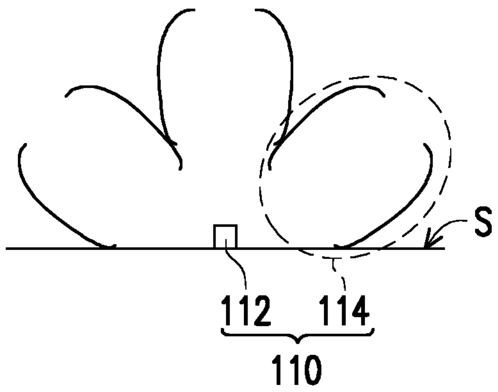

According to demand, the light receiver 110 may further include other elements. FIG. 2 and FIG. 3 respectively are cross-sectional schematic views of two types of light receiver according to an embodiment of the disclosure. Referring to FIG. 2 and FIG. 3, in addition to including the light sensing element 112, the light receiver 110 may further include a plurality of light converging elements 114, so as to increase receiving light capability of the light receiver 110 to receive light beam at large angle.

The light converging elements 114 are disposed above the light sensing element 112 to converge at least one of the light beams emitted by the light source devices to the light sensing element 112. Each light converging element 114 may be a lens, a reflector, or any known converging elements.

In FIG. 2, each light converging element 114 is a lens, and the focal length of each lens is equal to the shortest distance D between that lens and the light sensing element 112. It should be noted that, although FIG. 2 shows a plurality of lenses having the same design parameters (such as size, radius of curvature or focal length), the design parameters of each lens may be changed according to actual requirements and are not limited by FIG. 2.

In FIG. 3, each light converging element 114 is a reflector, such as a reflector having parabolic surface, and the focus point of each reflector is the location of the light sensing element 112. It should be noted that, although FIG. 3 shows a plurality of reflectors having the same design parameters (such as size or curvature), the design parameters of each reflector may be changed according to actual requirements and are not limited by FIG. 3.

The light-receiving area and the light-receiving intensity at different angles of the light receiver 110 may be effectively increased through the disposition of the light converging elements 114. The difference in receiving light intensity of the light converging elements 114 disposed at different positions may be compensated through optical parameter correction (such as correcting luminance) by the calculation module 120. In one embodiment, the difference in receiving light intensity at different angles can be further controlled by controlling the distance between each light converging element 114 and the light sensing element 112 and the size of each light converging element 114.

In FIG. 2 and FIG. 3, the light converging elements 114 are fixed above the light sensing element 112 by a fixing mechanism or an adhesive (such as being fixed on a surface S that the light sensing element 112 is disposed on), and a light transmitting media between the light converging elements 114 and the light sensing element 112 may include air or other transparent media, but the disclosure is not limited thereto.

Referring to FIG. 1 again, the calculation module 120 is coupled to the light receiver 110. After the light receiver 110 receives at least one of the light beams, the light receiver 110 can transmit a signal C corresponding to the at least one of the light beams to the calculation module 120 in either wired or wireless way. In one embodiment, the calculation module 120 may be built in the light receiver 110 or built in a mobile device, a gateway, or a cloud system, etc.

The calculation module 120 obtains at least one optical parameter of the at least one of the light beams according to the at least one of the light beams received by the light receiver 110. For example, the calculation module 120 obtains the at least one optical parameter of the at least one of the light beams according to the at least one of the light beams received by the light receiver 110 and via Fourier transform. For example, a light intensity, a color temperature, a color rendering index, an illumination ratio, or combination of at least two of the above of the at least one of the light beams is calculated.

Figure 4:
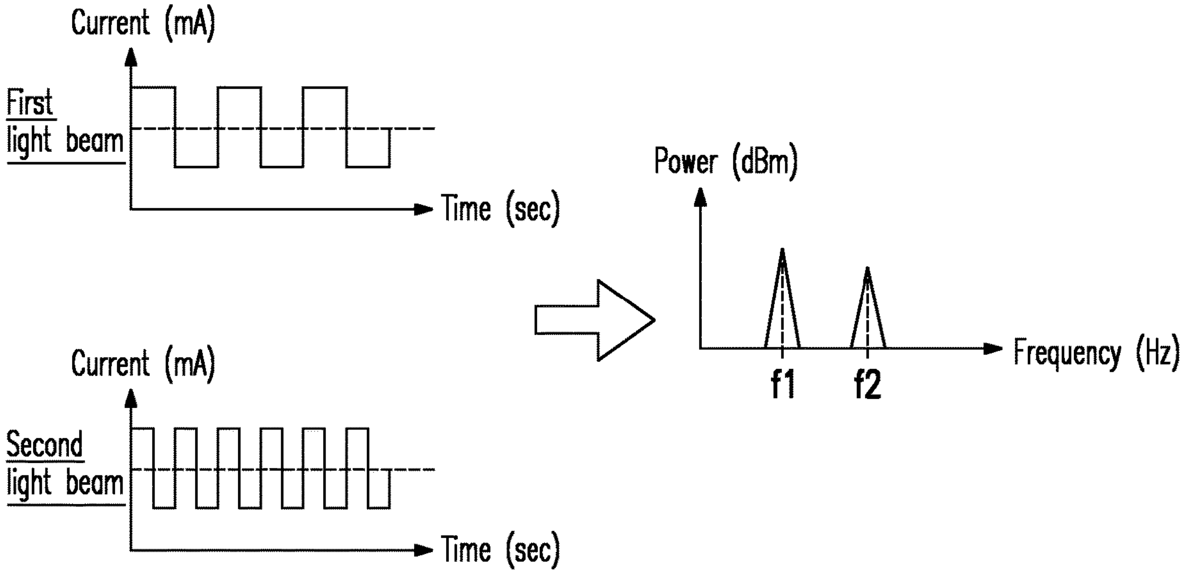
FIG. 4 is a schematic view of transforming a time domain into a frequency domain by using Fourier transform.

FIG. 4 is a schematic view of transforming a time domain into a frequency domain by using Fourier transform. Referring to FIG. 4, when the light receiver receives the first light beam and the second light beam having different frequencies, the light receiver obtains the current variation of each light beam in time domain. The calculation module can calculate the frequency and power of each light beam according to the light beams received by the light receiver and via Fourier transform. As shown in FIG. 4, since the first light beam and the second light beam have different frequencies, the calculation module, after the Fourier transform, can obtain two light signals corresponding to different frequencies (such as frequency f1 and frequency f2) in the frequency domain. That is to say, the calculation module can use Fourier transform to separate the light signals having different frequencies. Moreover, the calculation module can further obtain the light intensity, the color temperature, the color rendering index, the illumination ratio, or the combination of at least two of the above of each light beam via the calculated frequency and power.

For example, when the light receiver includes a spectrometer (that is, the light sensing element is a spectrometer), and the spectrometer receives at least one of the light beams emitted from the light source devices and produces at least one light spectrum corresponding to the at least one of the light beams. The calculation module calculates the frequency and the power of the at least one of the light beams in the whole band according to the at least one light spectrum and via Fourier transform, and further calculates the color temperature, the color rendering index, the illumination ratio or the combination of at least two of the above of the at least one of the light beams according to the calculated frequency and power. On the other hand, when the light sensing element of the light receiver is a photodiode, the photodiode receives at least one of the light beams emitted by the light source devices and produces the light signal (such as a current in a specific band of the at least one light beam) corresponding to the at least one of the light beams. Moreover, the calculation module calculates the frequency and the power of the at least one light beam in the specific band according to the light signal and via Fourier transform, and further calculates the luminance (or the light intensity), the illumination ratio, or a combination thereof of the at least one of the light beams according to the calculated frequency and power.

Referring to FIG. 1, the control module 130 is coupled to the calculation module 120 and the light source devices (such as the first light source device 101 and the second light source device 102), and the control module 130 controls the at least one optical parameter of the at least one of the light beams. Specifically, the control module 130 can be coupled to the calculation module 120 and the light source devices in either wired or wireless way. The calculation module 120 can transmit a calculating result R to the control module 130 in either wired or wireless way, and the control module 130 can transmit a control signal to at least one of the light source devices in either wired or wireless way in order to control the at least one optical parameter of the at least one of the light beams. In addition, the control module 130 may be built in the light receiver 110 or built in a mobile device, a gateway, or a cloud system, etc.

In the present embodiment, the total number of the light beams received by the light receiver 110 is equal to the total number of the light source devices. Specifically, the first light source device 101 emits the first light beam B1, and the second light source device 102 emits the second light beam B2. The light receiver 110 receives the first light beam B1 and the second light beam B2, and the light receiver 110 transmits the signal C corresponding to the first light beam B1 and the second light beam B2 to the calculation module 120. The calculation module 120 obtains the optical parameter of the first light beam B1 and the second light beam B2 according to the first light beam B1 and the second light beam B2 received by the light receiver 110. The control module 130 transmits a control signal C1 to the first light source device 101, and the control module 130 transmits a control signal C2 to the second light source device 102, so as to adjust at least one optical parameter of the first light beam B1 emitted by the first light source device 101 and at least one optical parameter of the second light beam B2 emitted by the second light source device 102. For example, the control module 130 can control the light intensity, the color temperature, the color rendering index, the illumination ratio, or the combination of at least two of the above of each of the first light beam B1 and the second light beam B2.

However, in another embodiment, the total number of the light beams received by the light receiver 110 may be smaller than the total number of the light source devices. For example, under the circumstance that not all of the light source devices are activated or one of the light source devices is located out of the receiving range of the light receiver 110, the total number of the light beams received by the light receiver 110 is less than the total number of the light source devices. Correspondingly, the calculation module 120 calculates the at least one optical parameter of the at least one of the light beams according to the at least one of the light beams received by the light receiver 110, and the control module 130 sends a control signal according to requirements to the light source device corresponding to the at least one of the light beams, so as to adjust the at least one optical parameter of the at least one of the light beams. Herein, the at least one optical parameter may be the light intensity, the color temperature, the color rendering index, the illumination ratio, or the combination of at least two of the above. In addition, the total number of the light source devices controlled by the control module 130 may be equal to or smaller than the total number of the light beams received by the light receiver 110.

Figure 5:
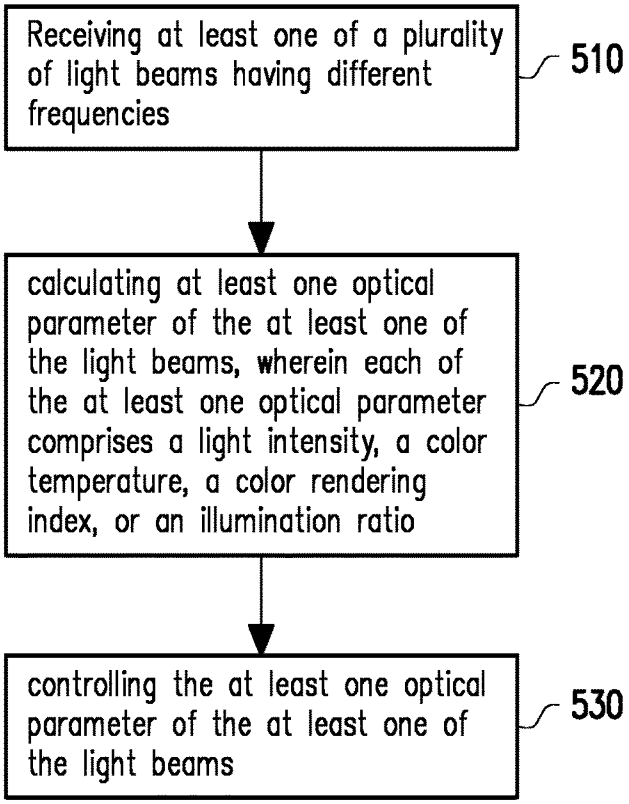
FIG. 5 is a flow chart of a controlling method of an illumination system according to an embodiment of the disclosure.

FIG. 5 is a flow chart of a controlling method of an illumination system according to an embodiment of the disclosure. Referring to FIG. 1 and FIG. 5, a controlling method of an illumination system (such as the illumination system 10) of the disclosure includes the following steps. Firstly, as shown in step 510, at least one of a plurality of light beams having different frequencies is received. Specifically, the light receiver 110 of the illumination system 10 is used to receive at least one of the first light beam B1 emitted from the first light source device 101 and the second light beam B2 emitted from the second light source device 102, wherein the first light beam B1 and the second light beam B2 is preset as having different frequencies.

Next, as shown in step 520, at least one optical parameter of the at least one of the light beams is calculated. The at least one optical parameter includes a light intensity, a color temperature, a color rendering index or an illumination ratio. Under the circumstance that the light receiver 110 receives the first light beam B1 and the second light beam B2, since the frequency f1 of the first light beam B1 is different from the frequency f2 of the second light beam B2, the calculation module 120 can use Fourier transform to transform the time domain to the frequency domain so as to differentiate two light beams, and calculate the light intensity, the color temperature, the color rendering index, the illumination ratio, or the combination of at least two of the above of each light beam according to the frequency and power of each of the two light beams.

Subsequently, as shown in step 530, the at least one optical parameter of the at least one of the light beams is controlled, such as the light intensity, the color temperature, the color rendering index, the illumination ratio, or the combination of at least two of the above of the at least one of the light beams is controlled. Specifically, since the light beams emitted by the light source devices are set to have different frequencies, when the optical parameter of any light beam and the required optical parameter are not matched or have deviation, the light source device to be adjusted can be instantly identified by confirming the light source device corresponding to the frequency, and the optical parameter of the light beam emitted from the light source device can be adjusted by the control module 130 so as to obtain the required lighting environment.

In one embodiment, the light intensity of the first light beam B1 (the light beam from the main lighting) may be controlled to be greater than or equal to two times as the light intensity of the second light beam B2 (the light beam from the environmental lighting) by the control module 130, so that the item illuminated by the first light beam B1 and the second light beam B2 is able to attract more attention. In another embodiment, when it is required to adjust the optical parameter of the light beam emitted from the light source device closer to the light receiver 110, the calculation module 120 compares the light intensities of the light beams to determine that which one of the light source devices is closest to the light receiver 110 (under the condition that the light beams have the same light intensities, the shorter distance between the light source device and the light receiver 110, the stronger luminance that the light receiver 110 receives). Next, it is possible to command the control module 130 to control the optical parameter of the light beam having the greatest light intensity (the light beam emitted from the closest light source device to the light receiver 110) in the light beams according to the determination result provided by the calculation module 120.

Figure 6:
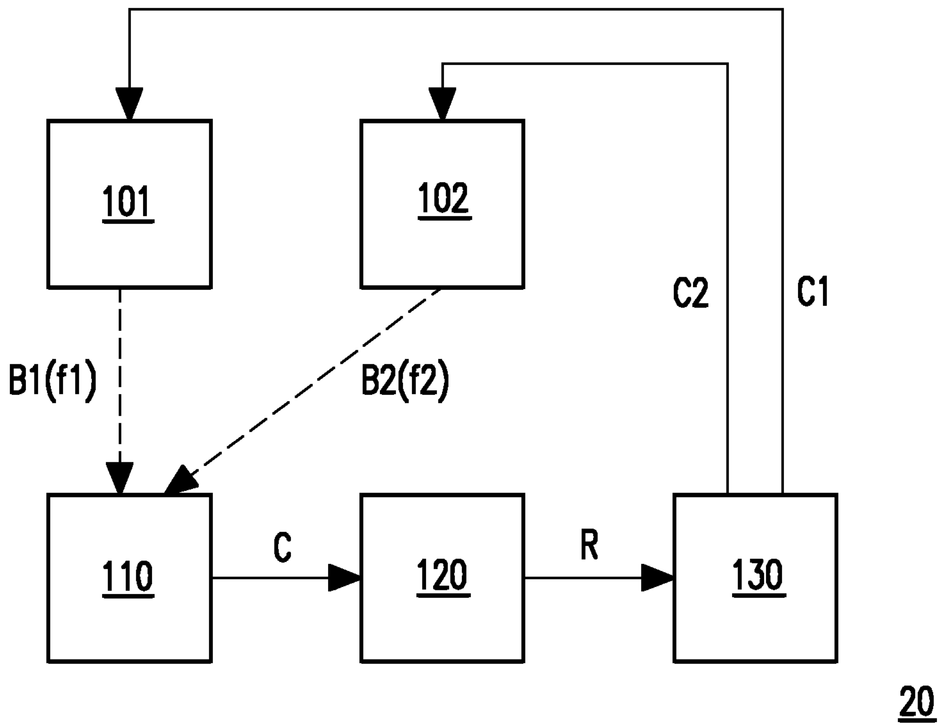
FIG. 6 to FIG. 8 respectively are schematic views of illumination systems according to other embodiments of the disclosure.
Figure 7:
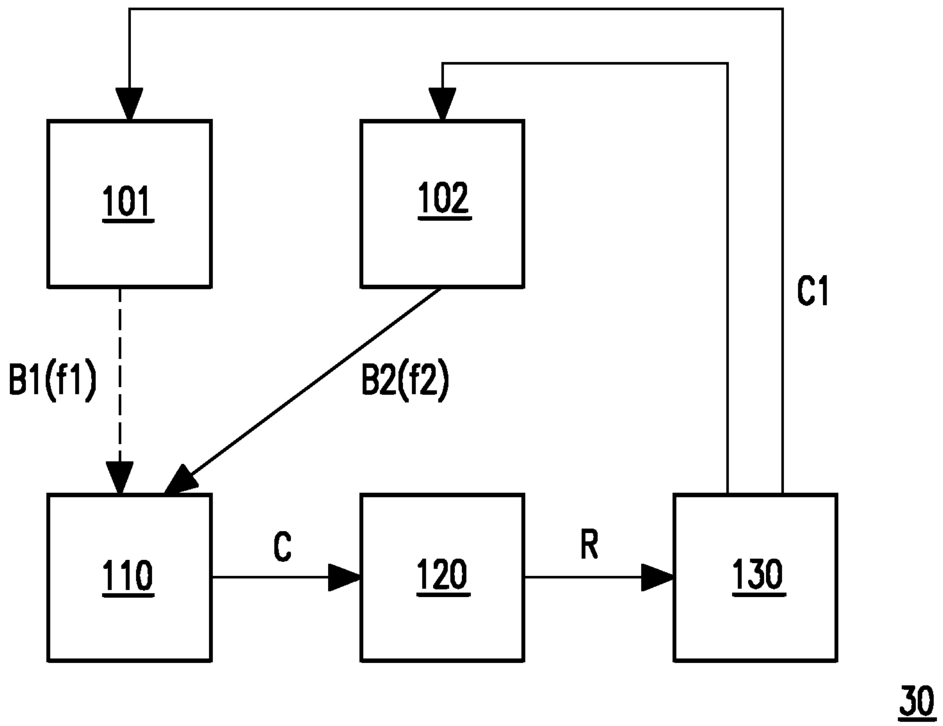
Figure 8:
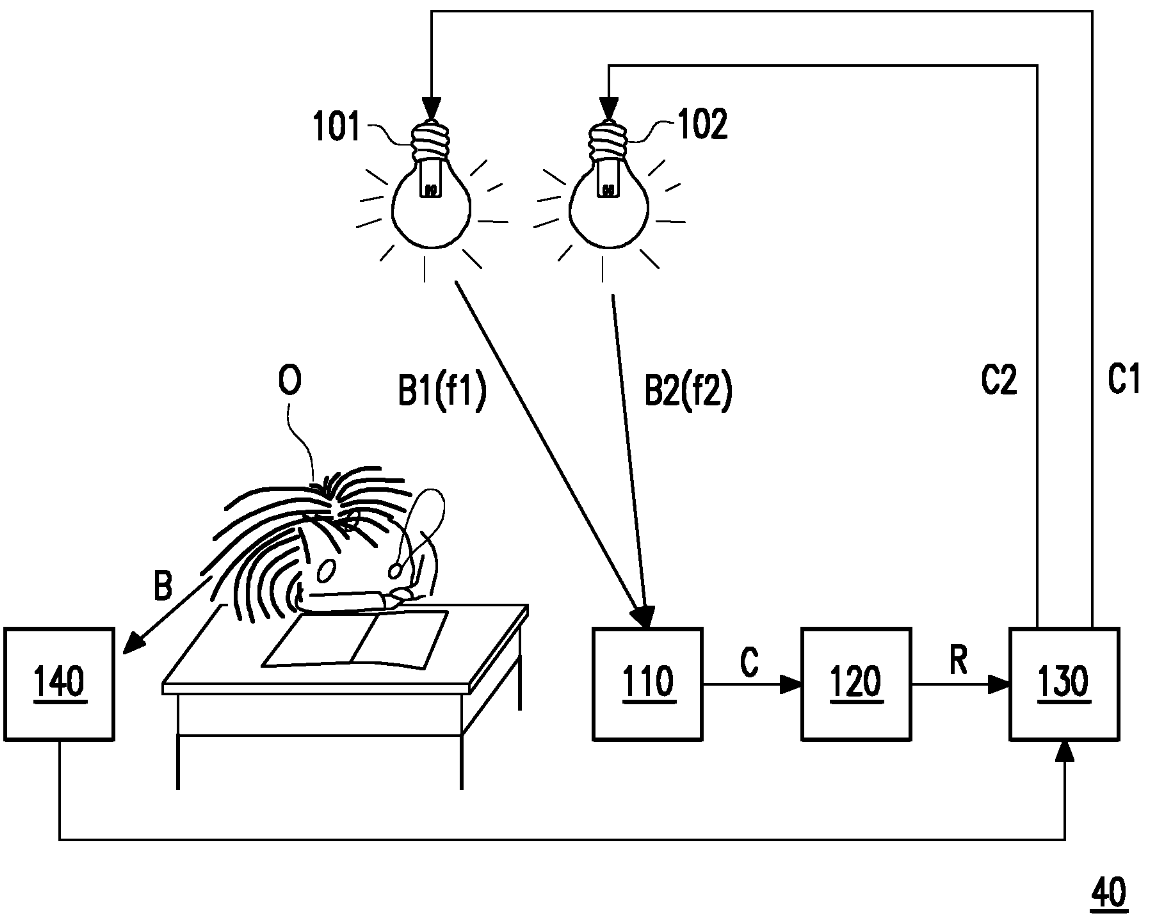

FIG. 6 to FIG. 8 respectively are schematic views of illumination systems according to other embodiments of the disclosure, and the same elements are indicated by the same reference number and will not be repeated hereinafter.

Referring to FIG. 6, the main difference between the illumination system 20 and the illumination system 10 in FIG. 1 is that the illumination system 20 further provides a function of activating the light source device(s). Specifically, under the circumstance that all of the light source devices are deactivated, the light intensity of the received light beams received by the light receiver 110 is zero. At this time, the control module 130 can send the control signal (such as radio frequency, but the disclosure is not limited thereto) to at least one of the light source devices, so as to activate the at least one of the light source devices.

Take FIG. 6 as an example, under the circumstance that the first light source device 101 and the second light source device 102 are all deactivated, the light intensity received by the light receiver 110 is zero. At this time, the control module 130 can transmit the control signal C1 to the first light source device 101, and the control module 130 can transmit the control signal C2 to the second light source device 102, so as to activate the first light source device 101 and the second light source device 102. However, in another embodiment, the total number of the light source devices activated by the control module 130 may be smaller than the total number of the light source devices. Specifically, the control module 130 can also activate only one of the light source devices.

Referring to FIG. 7, the main difference between the illumination system 30 and the illumination system 20 in FIG. 6 is that the calculation module 120 of the illumination system 30 can further determine whether all of the light source devices of the illumination system 30 are activated, and under the condition that a portion of the light source devices are not activated, the illumination system 30 can activate the portion of light source devices. Specifically, the information, such as the total number of the light source devices in the illumination system 30, the frequencies of the light beams emitted from the light source devices, etc may be built in the calculation module 120. After the signal C from the light receiver 110 is received by the calculation module 120, whether the number of frequency types received by the light receiver 110 is smaller than the total number of the light source devices can be determined through the calculation module 120. If the number of frequency types received by the light receiver 110 is smaller than the total number of the light source devices, the calculation module 120 can further detect the frequency having zero light intensity in the built-in frequencies so as to determine the non-activated light source device and can instruct the control module 130 to transmit the control signal to the non-activated light source device, so as to activate the non-activated light source device.

Take FIG. 7 as an example, the light receiver 110 only receives the second light beam B2. The calculation module 120 can calculate that the total number of frequency types (one type) received by the light receiver 110 is smaller than the total number of the light source devices (two light source devices). The calculation module 120 can further detect that the light intensity of the first light beam B1 corresponding to the frequency f1 is zero, and thus determine that the first light source device 101 is deactivated. The calculation module 120 can instruct the control module 130 to transmit the control signal C1 to the first light source device 101, so as to activate the first light source device 101. In another embodiment, when the number of the non-activated light source devices is greater than one (such as N), the control module 130 can activate all of the non-activated light source devices or some of the non-activated light source devices. In other words, the total number of the activated light source devices may be greater than one and smaller than or equal to N.

Referring to FIG. 8, the main difference between the illumination system 40 and the illumination system 10 in FIG. 1 is that the illumination system 40 further includes a physiological sensing device 140. The physiological sensing device 140 is coupled to the control module 130. The physiological sensing device 140 is configured to sense a physiological parameter B of the target object O. The physiological parameter B may include a heart rate, a heartbeat frequency, a blood pressure, a body temperature, or a respiratory rate. For example, the physiological sensing device 140 may be a smart phone or a smart watch capable of measuring the physiological parameter B, but the disclosure is not limited thereto. In one embodiment, the physiological sensing device 140 may be built in the light receiver 110 or built in a mobile device, a gateway, or a cloud system, etc.

Through the disposition of the physiological sensing device 140, the control module 130 can instantly obtain the location information of each of the target objects O and the physiological parameter B of each of the target objects O. The location information of each of the target objects O may be used to determine whether the target object O is located in the lighting environment of the illumination system 40, and the physiological parameter B of each of the target objects O may be used to evaluate the mental status of the target object O (for example, awake or sleepy). Correspondingly, the control module 130 can control one of the light intensity, the color temperature, the color rendering index, the illumination ratio, or the combination of at least two of the above of the at least one of the light beams according to the physiological parameter B, so as to change the metal status of the target object O.

Take FIG. 8 as an example, when the target object O (such as a student) is in the lighting environment of the illumination system 40, and when the heart rate or the respiratory rate of the target object O becomes slow, which means that the target object O is drowsy, the light intensity, the color temperature, or the combination of two of the above of the at least one of the light beams can be controlled by the control module 130 (for example, all of the light source devices provide bluish white light or only the light source device above the target object O provides bluish white light), so that the target object O becomes more concentrated, thereby increasing the learning efficiency and academic performance.

In summary, in the embodiments of the disclosure, since the light source devices emit the light beams having different frequencies, the optical parameter of the light beam emitted from each of the light source devices is instantly identified and feedback to the control module to adjust the target optical parameter. Accordingly, the illumination system and the control method thereof of the disclosure is capable of solving the problems of inconvenience and lack of efficiency in use of the conventional technology. In one embodiment, the light receiver of the illumination system can further include light converging elements, so as to increase the light-receiving area and the light-receiving intensity at different angles of the light receiver. In another embodiment, the illumination system can further provide the function of activating the light source device or the function of determining whether the light source devices of the illumination system are all activated. In yet another embodiment, the illumination system may further include the physiological sensing device so as to adjust the lighting environment according to the physiological parameter of the target object.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An illumination system, comprising:

a plurality of light source devices, respectively emitting a plurality of light beams having different flicker frequencies, wherein each of the flicker frequencies is greater than 100 Hz;

a light receiver, receiving at least one of the light beams emitted from the light source devices;

a calculation module, coupled to the light receiver, wherein the calculation module obtains at least one optical parameter of the at least one of the light beams according to the at least one of the light beams received by the light receiver, each of the at least one optical parameter comprises a light intensity, a color temperature, a color rendering index or an illumination ratio; and a control module, coupled to the calculation module and the light source devices, wherein the control module controls the at least one optical parameter of the at least one of the light beams, and wherein the control module transmits a control signal to at least one of the light source devices to activate the at least one of the light source devices when the calculation module calculates that a number of frequency types of the light beams received by the light receiver is less than a total number of the light source devices or a light intensity received by the light receiver is zero.

2. The illumination system as recited in claim 1, wherein the light receiver comprises:

a light sensing element; and a plurality of light converging elements, disposed above the light sensing element to converge the at least one of the light beams to the light sensing element.

3. The illumination system as recited in claim 1, wherein the light receiver comprises a spectrometer, and the spectrometer receives at least one of the light beams emitted from the light source devices and produces at least one light spectrum corresponding to the at least one of the light beams.

4. The illumination system as recited in claim 3, wherein the calculation module obtains the at least one optical parameter of the at least one of the light beams according to the at least one light spectrum and via Fourier transform.

5. The illumination system as recited in claim 1, wherein the light source devices comprise a first light source device and a second light source device, the first light source device emits a first light beam having a first flicker frequency, the second light source device emits a second light beam having a second flicker frequency, and the control module controls a light intensity of the first light beam to be greater than or equal to a light intensity of the second light beam.

6. The illumination system as recited in claim 5, wherein the light intensity of the first light beam is 2 to 20 times as the light intensity of the second light beam.

7. The illumination system as recited in claim 1, further comprising:

a physiological sensing device, coupled to the control module, wherein the physiological sensing device senses a physiological parameter of a target object.

8. The illumination system as recited in claim 7, wherein the control module controls the at least one optical parameter of the at least one of the light beams according to the physiological parameter.

9. An illumination system, comprising:

a plurality of light source devices, respectively emitting a plurality of light beams having different flicker frequencies, wherein each of the flicker frequencies is greater than 100 Hz;

a light receiver, receiving at least one of the light beams emitted from the light source devices;

a calculation module, coupled to the light receiver, wherein the calculation module obtains at least one optical parameter of the at least one of the light beams according to the at least one of the light beams received by the light receiver, each of the at least one optical parameter comprises a light intensity, a color temperature, a color rendering index or an illumination ratio;

a control module, coupled to the calculation module and the light source devices, wherein the control module controls the at least one optical parameter of the at least one of the light beams; and a physiological sensing device, coupled to the control module, wherein the physiological sensing device senses a physiological parameter of a target object.

10. The illumination system as recited in claim 9, wherein the physiological parameter comprises a heart rate, a heartbeat frequency, a blood pressure, a body temperature, or a respiratory rate.

11. The illumination system as recited in claim 9, wherein the control module controls the at least one optical parameter of the at least one of the light beams according to the physiological parameter.

12. A control method of an illumination system, comprising:

receiving at least one of a plurality of light beams having different flicker frequencies, wherein each of the flicker frequencies is greater than 100 Hz;

calculating at least one optical parameter of the at least one of the light beams, wherein each of the at least one optical parameter comprises a light intensity, a color temperature, a color rendering index, or an illumination ratio;

controlling the at least one optical parameter of the at least one of the light beams;

calculating a number of frequency types of the received light beams or determining whether the light intensity of the received light beams is zero; and transmitting a control signal to at least one of the light source devices to activate the at least one of the light source devices when the number of the frequency types of the light beams received by the light receiver is less than a total number of the light source devices or the light intensity received by the light receiver is zero.

13. The control method of the illumination system as recited in claim 12, further comprising:

comparing the light intensities of the light beams; and controlling the at least one optical parameter of a light beam having the greatest light intensity in the light beams.

14. The control method of the illumination system as recited in claim 12, wherein a method of calculating the at least one optical parameter of the at least one of the light beams comprises:

producing at least one light spectrum according to the at least one of the light beam; and calculating the at least one optical parameter of the at least one of the light beams according to the at least one light spectrum and via Fourier transform.

15. The control method of the illumination system as recited in claim 12, wherein a method of controlling the at least one optical parameter of the at least one of the light beams comprises:

controlling a light intensity of a first light beam in the light beams to be greater than or equal to a light intensity of a second light beam in the light beams.

16. The control method of the illumination system as recited in claim 15, wherein the method of controlling the at least one optical parameter of the at least one of the light beams comprises:

controlling the light intensity of the first light beam to be 2 to 20 times as the light intensity of the second light beam.

17. The control method of the illumination system as recited in claim 12, wherein a method of controlling the at least one optical parameter of the at least one of the light beams comprises:

controlling at least one of the light intensity, the color temperature, the color rendering index, or the illumination ratio of the at least one of the light beams.

18. A control method of an illumination system, comprising:

receiving at least one of a plurality of light beams having different flicker frequencies, wherein each of the flicker frequencies is greater than 100 Hz;

calculating at least one optical parameter of the at least one of the light beams, wherein each of the at least one optical parameter comprises a light intensity, a color temperature, a color rendering index, or an illumination ratio;

controlling the at least one optical parameter of the at least one of the light beams; and sensing a physiological parameter of a target object, and controlling the at least one optical parameter of the at least one of the light beams according to the physiological parameter.

* * * * *